United States Patent [19]

Fujimoto

[11] Patent Number: 5,481,381
[45] Date of Patent: Jan. 2, 1996

[54] COLOR IMAGE READING APPARATUS

[75] Inventor: Makoto Fujimoto, Yokohama, Japan

[73] Assignee: Canon Kabushiki Kaisha, Tokyo, Japan

[21] Appl. No.: 430,147

[22] Filed: Apr. 26, 1995

Related U.S. Application Data

[63] Continuation-in-part of Ser. No. 979,051, Nov. 19, 1992, abandoned.

[30] Foreign Application Priority Data

Nov. 20, 1991 [JP] Japan ................. 3-332532

[51] Int. Cl.⁶ .............. H04N 1/48; H04N 1/04; G02B 5/18; G02B 5/20
[52] U.S. Cl. .......... 358/505; 358/514; 358/515; 359/571; 359/889; 359/890; 250/237 R
[58] Field of Search .............. 358/505, 511, 358/512, 513, 514, 515; 250/237 R, 237 G, 226; 359/571, 569, 566, 558, 889, 890, 589, 590; 362/293

[56] References Cited

U.S. PATENT DOCUMENTS

| | | |
|---|---|---|
| 3,426,293 | 2/1969 | Snitzer ................. 359/236 |
| 4,277,138 | 7/1981 | Dammann . |
| 5,140,464 | 8/1992 | Kyogoku et al. ............ 359/589 |

FOREIGN PATENT DOCUMENTS

| | | |
|---|---|---|
| 0383308 | 8/1990 | European Pat. Off. . |
| 0440169 | 8/1991 | European Pat. Off. . |
| 2645075 | 4/1978 | Germany . |
| 62-43594 | 9/1987 | Japan . |
| 63-250534 | 10/1988 | Japan . |

OTHER PUBLICATIONS

Dammann, Color Separation Gratings, 1 Aug. 1978, vol. 17, No. 15, pp. 2273–2279.

*Primary Examiner*—Scott A. Rogers
*Attorney, Agent, or Firm*—Fitzpatrick, Cella, Harper & Scinto

[57] ABSTRACT

A color image reading apparatus comprises a plurality of line sensors which are a plurality of one-dimensional sensor arrays disposed on a single substrate, a projection optical system for projecting an image of a subject on the sensors, a blazed diffraction grating disposed in an optical path between the projection optical system and the sensors to separate light from the subject into a plurality of color lights, and a wavelength selection device disposed in an optical path between the subject and the sensors to permit only a beam of light within a specific wavelength range to pass therethrough.

22 Claims, 6 Drawing Sheets

MAIN SCANNING SECTION

COLOR IMAGE READING APPARATUS

This application is a continuation of application Ser. No. 07/979,051, filed Nov. 19, 1992, now abandoned.

BACKGROUND OF THE INVENTION

1. Field of the Invention

The present invention relates to a color image reading apparatus. Specifically, the invention relates to a color image reading apparatus suitably applicable to a color scanner, a color facsimile machine, and the like, which uses a color separator comprising a blazed diffraction grating and detection means comprising three line sensors disposed on a surface of a single substrate and which may read color image information on a plane of an original at a high precision without color blur.

2. Related Background Art

There have been proposed various reading apparatuses in which color image information on a plane of an original is formed through an optical system on line sensors such as CCD and the color image information is digitally read using output signals of the line sensors.

For example, Japanese Patent Publication No. 62-43594 describes a color image detection apparatus in which color image information is color-separated by using a blazed diffraction grating as an optical element for color separation and in which the thus-separated color image information is guided to three monolithic line sensors to detect the color image information. U.S. Pat. Nos. 4,277,138 and Des. 2,645,075 also disclose a color image reading apparatus using such a blazed diffraction grating as color separation means.

The method for color separation using the blazed diffraction grating, in which an incident optical flux is separated into a plurality of color lights as diffraction light of certain order, is in general characterized by easy color separation in a simple arrangement.

When the incident optical flux is diffracted and color-separated by the blazed diffraction grating, spectral characteristics and angles of emission of color light beams obtained depend upon conditions such as an incident angle of the optical flux into the blazed diffraction grating, a grating pitch of the diffraction grating, and a diffraction order. Thus, the incident optical flux must be incident at a certain angle onto the blazed diffraction grating for example, in order to guide the plural color lights color-separated by the blazed diffraction grating to the respective line sensors in a satisfactory precision.

However, in case that a color image is formed by a projection optical system on the line sensors while being color-separated into color images based on a plurality of color lights through the blazed diffraction grating, optical fluxes from so-called off-axial images neighboring the object color image on the plane of the original also enter the blazed diffraction grating through the projection optical system at different angles.

Those optical fluxes from the off-axial images are color-separated by the blazed diffraction grating and then enter the line sensors to become color blur of unnecessary color lights (for example of ± first order diffraction light). The color blur results in decrease in reading precision of the color image, which has been problematic in the conventional apparatuses.

SUMMARY OF THE INVENTION

It is an object of the present invention to provide a color image reading apparatus in which, in reading a color image after color separation using a blazed diffraction grating, wavelength selection means satisfying a predetermined condition is disposed between a plane of an original and a blazed diffraction grating, which thereby may effectively prevent color blur which could otherwise appear because of optical fluxes from off-axial images diffracted by the blazed diffraction grating and entering the line sensors, and which may digitally read the color image through three color lights for example of R, G, and B in a high precision.

A color image reading apparatus is characterized in that illuminating means illuminates a color image on a plane of an original, that a projection optical system projects the color image onto a surface of detecting means comprising three line sensors parallel to each other on a single substrate, that a one-dimensional blazed diffraction grating is disposed after the projection optical system to separate an optical flux from the projection optical system into three color lights then to guide them to the respective line sensors in reading the color image by the detecting means, and that wavelength selecting means is provided in an optical path between the original plane and the one-dimensional blazed diffraction grating to permit only an optical flux within a specific wavelength range to pass therethrough.

Specifically, the present invention is characterized in that the wavelength selection means comprises a wideband filter and that an incident angle of an optical flux into the wideband filter is adjusted to make the passing wavelength range variable.

DETAILED DESCRIPTION OF THE PREFERRED EMBODIMENTS

Figure 1A:
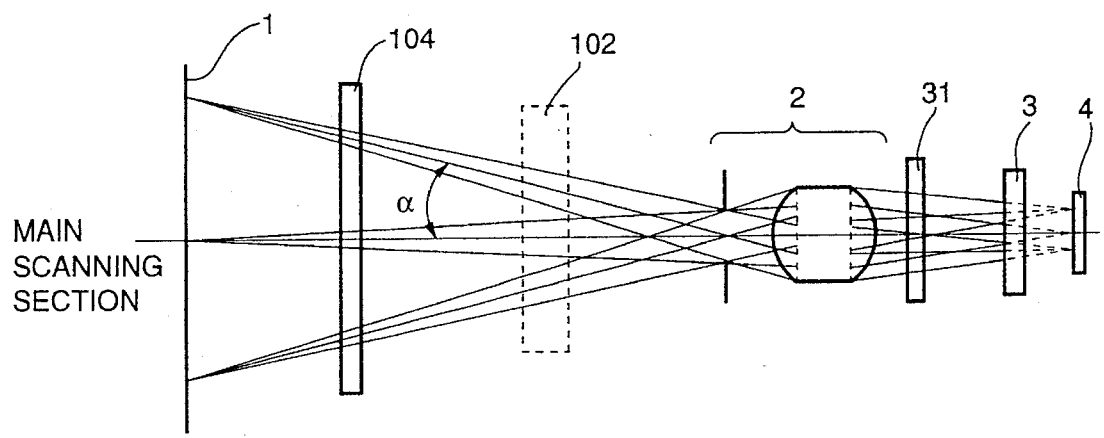
FIG. 1A and FIG. 1B are main part schematic drawings to show a main scanning section and a sub scanning section of an optical system in a first embodiment of a color image reading apparatus according to the present invention.
Figure 1B:
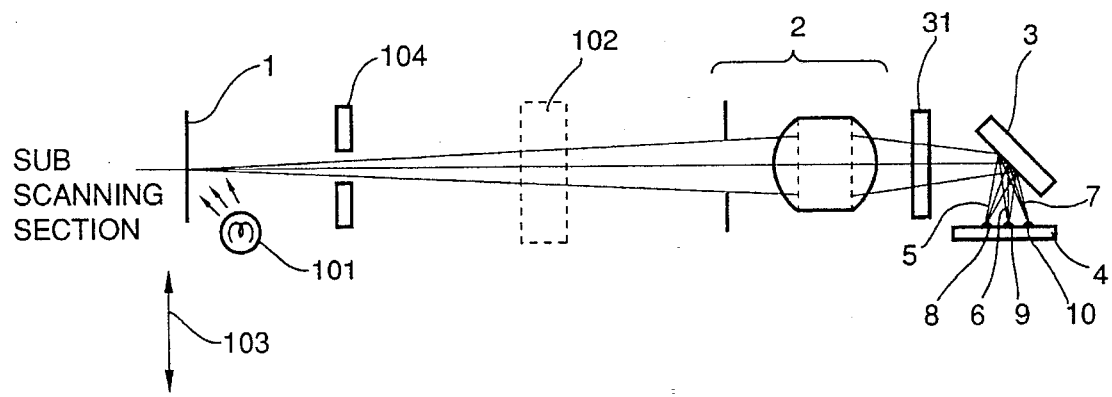
Figure 2:
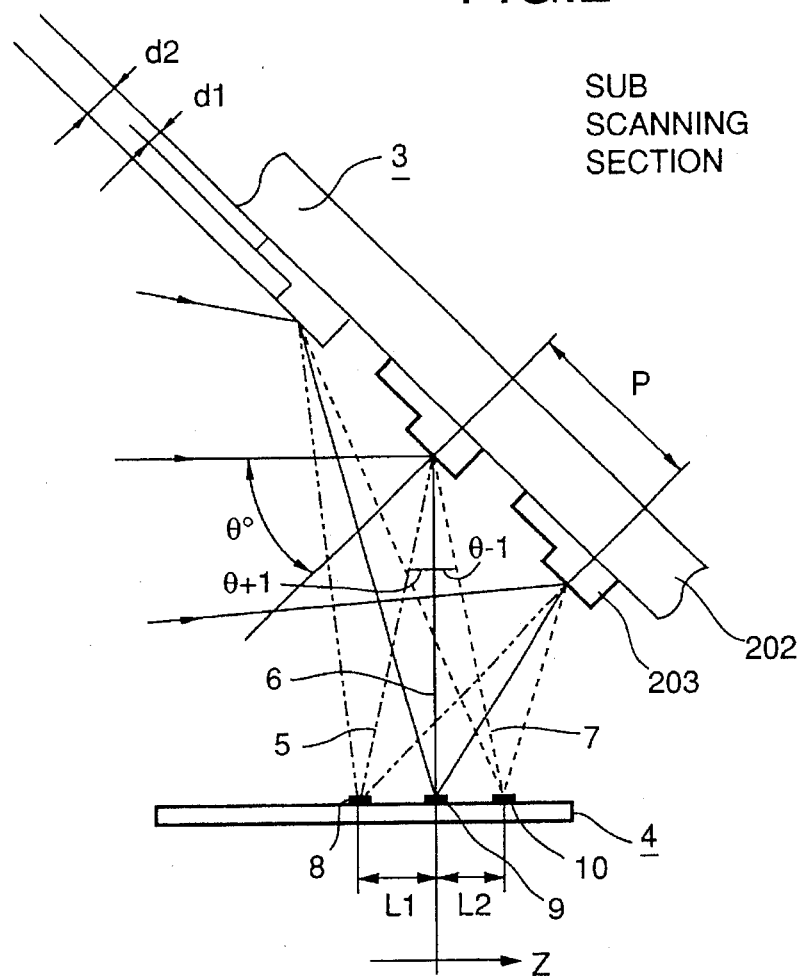
FIG. 2 is an explanatory drawing to show a reflection-type one-dimensional blazed diffraction grating as shown in FIGS. 1A and 1B.
Figure 3A:
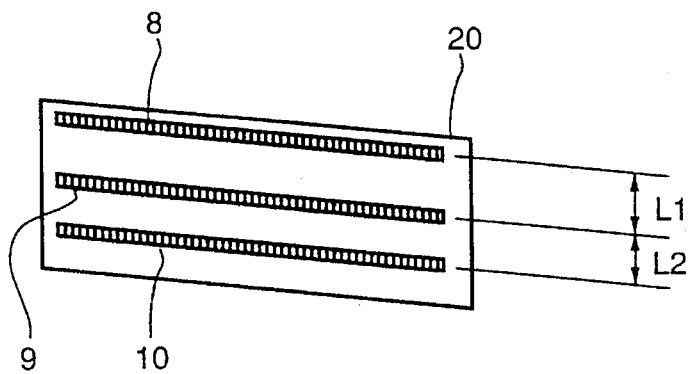
FIG. 3A and FIG. 3B are partly enlarged explanatory drawings of FIGS. 1A and 1B.
Figure 3B:
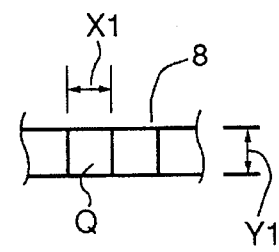

FIG. 1A and FIG. 1B are main part schematic drawings to show a main scanning section, and a sub scanning section including an optical axis and being perpendicular to a main scanning direction in a first embodiment of a color image reading apparatus according to the present invention. FIG. 2, FIG. 3A, and FIG. 3B are partly enlarged explanatory drawings of FIGS. 1A and 1B.

In FIGS. 1A–3B, reference numeral 1 designates a plane of an original, which is a subject and on which a color image is formed. Numeral 101 denotes illumination means, which comprises for example a halogen lamp or a fluorescent lamp. Numeral 104 designates a slit, which has an opening elongated in the main scanning direction, i.e., in a direction of pixel alignment in line sensors 8, 9, 10 as described below. The slit 104 prevents optical fluxes from regions greatly apart from an image reading region on the original plane 1 from entering a projection optical system 2 as described below.

Numeral 102 represents scanning means comprising a mirror, which linearly scans the original plane 1 in a sub scanning direction 103 (the vertical direction on the sheet plane of FIG. 1B). Numeral 2 is the projection optical system, which is structured as a so-called exit-type telecentric system with a principal ray on the exit side being parallel to the optical axis. Numeral 3 denotes color separation means, which comprises a reflection-type one-dimensional blazed diffraction grating. The color separation means 3 separates the incident optical flux into three color lights, for example red light (R light) 5, green light (G light) 6, and blue light (B light) 7, and makes them reflectively diffracted.

Specifically, image information on the original plane 1 is read by moving a color image reading portion (the projection optical system 2, the one-dimensional blazed diffraction grating 3, and a sensor 4) relative to the original plane 1 in the sub scanning direction.

Numeral 4 designates detection means for image reading, which comprises a monolithic three line sensor. The monolithic three line sensor comprises three line sensors 8, 9, and 10 each having a plurality of pixels aligned in a one-dimensional direction as shown in FIG. 3. The three line sensors 8, 9, 10 are located apart at finite distances from each other on a single substrate 20 such that three lines made with the plurality of pixels aligned are parallel to each other. Thus, the detection means 4 is the plural line sensors in which a plurality of linear sensor arrays are provided on the single substrate, apart at finite distances from each other in the direction perpendicular to the alignment direction of the sensor arrays. The respective line sensors 8, 9, 10 on the sensor 4 extend in the main scanning direction (in the direction normal to the sheet plane of FIG. 1B).

Distances L1 and L2 between the respective two line sensors are set at different values considering color separation directions of the color separator 3. Numeral 31 denotes wavelength selection means, which comprises a wideband filter which permits only an optical flux within a specific wavelength range to pass therethrough.

In the present embodiment, the illumination means 101 illuminates the color image on the original plane 1; scattered reflection light from the color image is scanned by the scanning means 102 in the sub scanning direction; the optical flux from the scanning means 102 is converged by the projection optical system 2; only an optical flux within a predetermined wavelength range is passed through the wavelength selection means 31; and the passed optical flux is thereafter separated by the one-dimensional blazed diffraction grating 3 into three color lights in the sub scanning direction, i.e., in the direction perpendicular to the array direction of the sensor arrays. Color images based on the thus-separated respective color lights are formed on the three line sensors 8, 9, 10, respectively. By this arrangement, the color image on the original plane 1 may be sequentially digitally read by the detection means 4.

The color separation means 3 of the present embodiment comprises, as shown in FIG. 2, a reflection-type one-dimensional blazed diffraction grating in which a phase portion 203 is arranged in a one-dimensional direction on a substrate 202 to reflectively diffract the incident optical flux while providing a phase difference. The one-dimensional blazed diffraction grating for color separation is disclosed for example in Applied Optics Vol. 17, No. 15, 2278–2276 (1 Aug. 1978).

Figure 4:
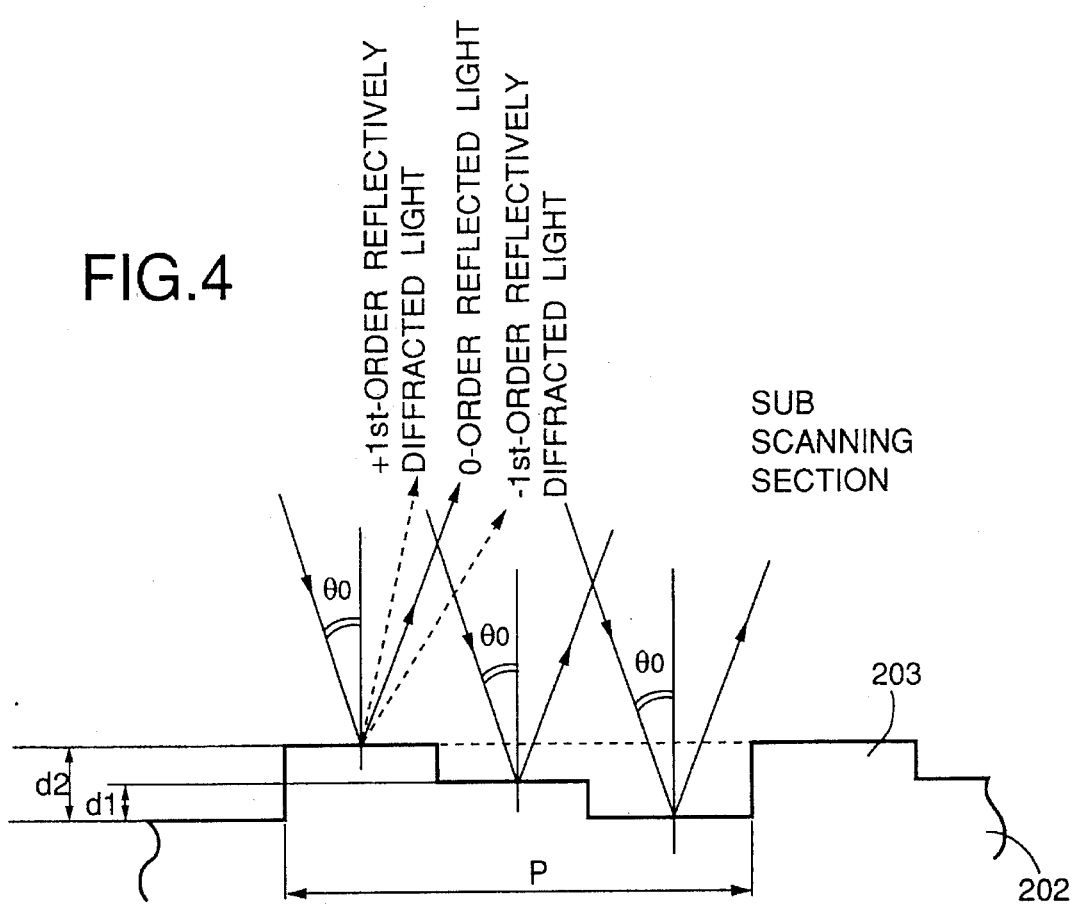
FIG. 4 is a partly enlarged explanatory drawing of FIGS. 1A and 1B.

Specifically, according to the fundamental optical properties, an optical flux incident at an angle $\theta_0$ to the substrate 202 is reflectively diffracted by the phase portion 203 which has a stepped structure with a period (pitch) P to effect reflection diffraction to separate the optical flux into predetermined three color lights with three phase differences given thereto, as shown in FIG. 4.

As shown in FIG. 1A, a finite reading width exists on the original plane 1 in the main scanning section, and the width defines an angle of view $\alpha$ to the image forming optical system 2.

Figure 5:
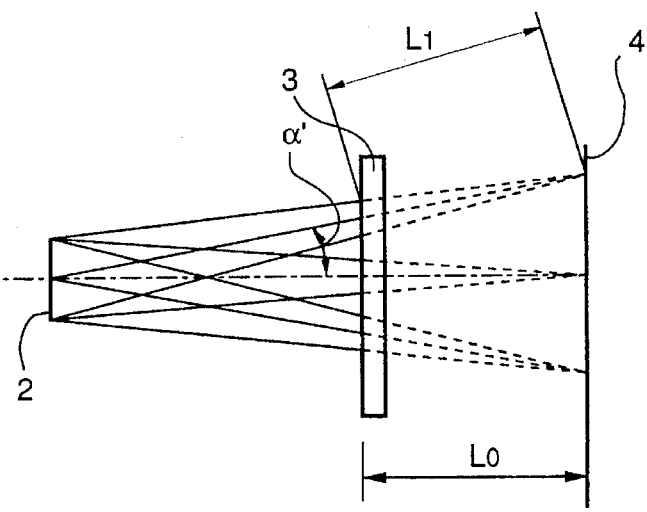
FIG. 5 is a partly enlarged explanatory drawing of FIGS. 1A and 1B.

Suppose that an optical flux incident at an angle of view $\alpha$ goes out of the imaging optical system 2 on the exit side thereof for example at an angle $\alpha'$ as shown in FIG. 5. Let a distance after reflection diffraction from the reflection-type one-dimensional blazed diffraction grating to one line sensor of the detection means 4 be $L_0$ on the axis, and another distance along an off-axial line at the exit angle $\alpha'$ be $L_1$. Then, $L_1 = L_0/\cos \alpha'$. (Incidentally, the optical fluxes are shown in an expanded state as shown by broken lines in FIG. 5. In an ordinary optical system $\alpha \approx \alpha'$.)

Letting a separation distance to zeroth order light on the surface of the line sensors through the first-order reflection diffraction by the reflection-type one-dimensional blazed diffraction grating be Z, and using the reference characters in FIGS. 4 and 5, the following relation exists.

$$Z = L \times \tan\{\sin^{-1}(\pm\lambda/P + \sin\theta_0) - \theta_0\} \qquad (1),$$

where $\lambda$ is a wavelength, $\theta_0$ an incident angle, P a grating pitch, L is $L_0$ or $L_1$, and signs of ($\pm$) correspond to $\pm$ first order, respectively.

As seen from the equation (1), the separation distance Z is not constant unless $L = L_0$ or $L_1$, i.e., unless $\alpha' = 0$. In other words, optical fluxes of fixed wavelengths cannot be correctly formed on the respective line sensors linearly aligned parallel to each other.

Thus, the present embodiment employs an image forming optical system in which the exit angle $\alpha'$ is always zero degree irrespective of the incident angle $\alpha$, which is of an exit-type telecentric system. Then, the separation distance Z in the equation (1) becomes constant in the present embodiment.

If grating thicknesses d1 and d2 of grating pattern of the reflection-type blazed diffraction grating as shown in FIG. 2 are determined such that d1=909 nm and d2=1818 nm, a central wavelength $\lambda_0$ of zeroth order diffraction light is 525 nm, a central wavelength $\lambda_{+1}$ of + first order diffraction light is 592 nm, and a central wavelength $\lambda_{-1}$ of − first order diffraction light is 472 nm. The following relations exist:

$$\lambda = 2d_1 \cdot \cos\theta_0/m = 2d_2 \cdot \cos\theta_0/(2m) \quad (2),$$

$\lambda_{+1}$: $m=3-\frac{1}{3}$, $\lambda_{-1}$: $m=3+\frac{1}{3}$, $\lambda_0$: $m=3$,
where values for $\lambda_{+1}$ are approximate values.

In case that the grating pitch P=180 µm, that the distance L=45 mm, and that the incident angle $\theta_0=30°$, the respective separation distances $Z\lambda_{+1}$ and $Z\lambda_{-1}$ of first order diffraction light and of − first order diffraction light are calculated as follows:

$Z\lambda_{+1}=0.171$ mm;

$Z\lambda_{-1}=-0.136$ mm.

According to these values, the sensor line gaps L1 and L2 of the three line sensors as shown in FIG. 3A are determined as follows in the present embodiment:

L1=0.171 mm;

L2=0.136 mm.

Dimensions of each pixel Q in the line sensor 8 as shown in FIG. 3B are for example as follows:

x1=10 µm; and y1=10 µm.

From the equation (1), a wavelength range of light incident into a light receiving plane of a pixel Q is about 30 nm. The optical flux of + first order diffraction light ($\lambda_{+1}$, R) having wavelengths of about 577 to 607 nm and the optical flux of − first order diffraction light ($\lambda_{-1}$, B) having wavelengths of about 457 to 487 nm enter the line sensors 8 and 10, respectively.

Since the zeroth order diffraction light ($\lambda_0$, G) is not diffracted, a wavelength range thereof incident into a pixel Q is independent of a size of a pixel.

Figure 6A:
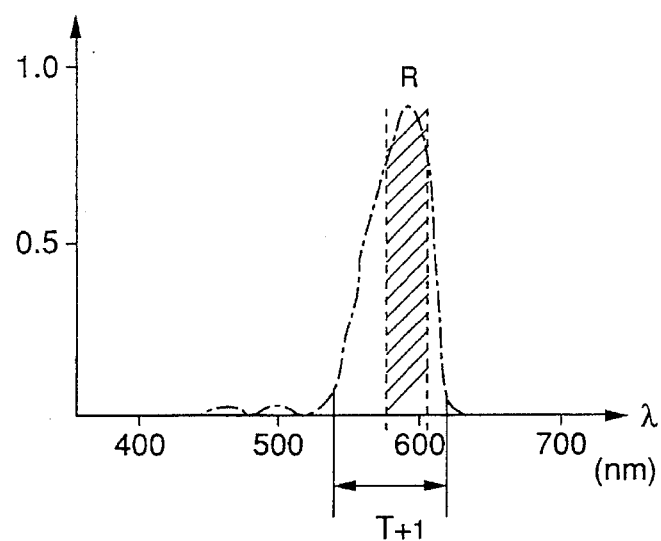
FIG. 6A, FIG. 6B, and FIG. 6C are explanatory drawings of spectral characteristics in reading a color image by respective line sensors according to the present invention.
Figure 6B:
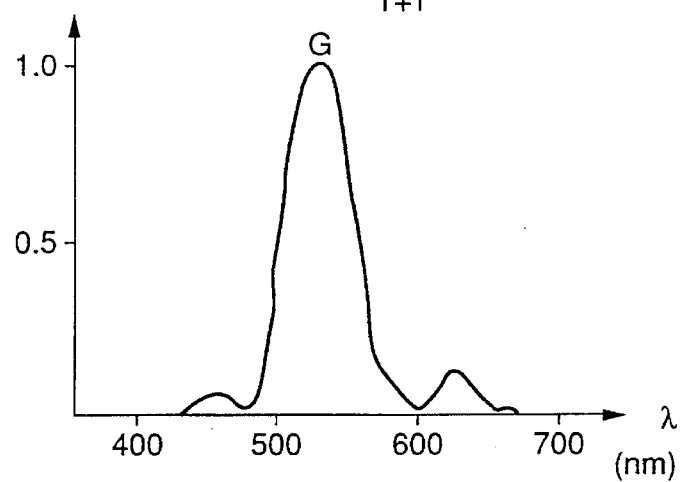
Figure 6C:
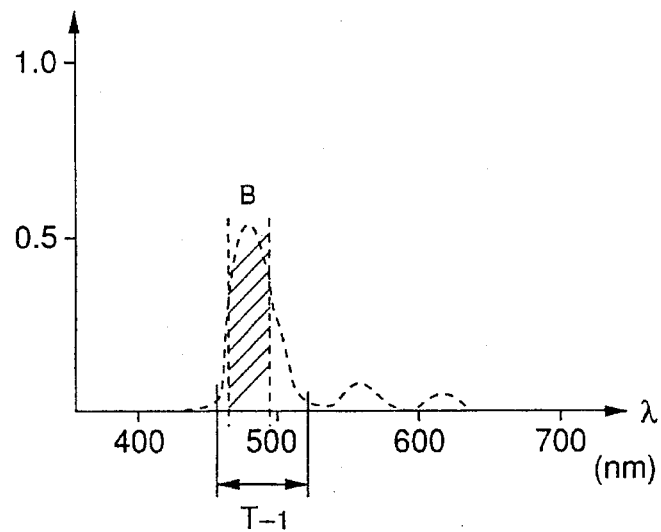

FIGS. 6A–6C show spectral distributions of separated components obtained if the reflection-type one-dimensional blazed diffraction grating of the present embodiment and a halogen lamp as the illumination means are used. FIG. 6A is a spectral distribution of + first order diffraction light, FIG. 6B that of zeroth order diffraction light, and FIG. 6C that of − first order diffraction light.

Light within a wavelength range as hatched in FIGS. 6A or 6C is to enter the pixels Q, but light in the other wavelength range becomes a factor to degrade a quality of image as color blur.

Generally, if a wavelength width $T_{+1}$ ($T_{-1}$) having a light quantity exceeding 10% of the light quantity of the peak wavelength in the spectrum distribution of ± first-order diffraction light is within a wavelength range of about two pixels (60 nm), the reduction of an MTF due to color blur influence can be suppressed to a little amount.

Accordingly, the wideband filter with the aforementioned wavelength width $T_{+1}$ ($T_{-1}$) being set as not more than 60 nm is employed as the wavelength selection means 31 in the present embodiment as the filter is located in an optical path between the original plane and the blazed diffraction grating.

Figure 7:
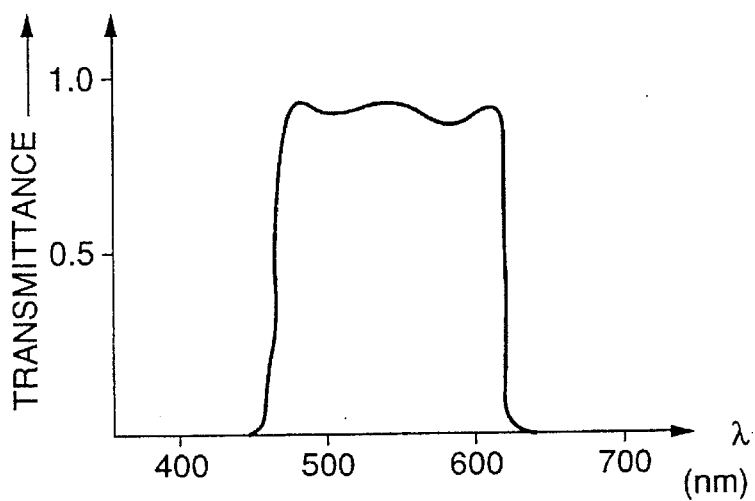
FIG. 7 is an explanatory drawing of spectral characteristics of wavelength selection means according to the present invention.

Specifically, out of the incident optical flux, light of wavelengths over 610 nm is cut off on the long wavelength side, light of wavelengths below 455 nm is off on the short wavelength side, and light of wavelengths between 455 and 610 nm passes through the filter, as shown in FIG. 7. This eliminates color blur in reading the color image by the line sensors.

Incidentally, although m=3 in the relation between the grating thickness d1, d2 of grating pattern and the central wavelength of each order in the aforementioned equation (2), the value of m could be any positive integer theoretically.

It is in general preferable that $m \geq 3$, because a blue component is likely to decrease because of the spectral characteristics of the illumination means when ± first order diffraction light is used. Further, a transmission-type one-dimensional blazed diffraction grating may be employed in place of the reflection-type one-dimensional blazed diffraction grating with the same effect.

Figure 8:
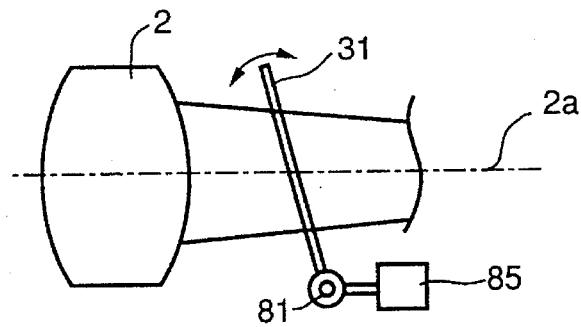
FIG. 8 is an explanatory drawing to show a part of a second embodiment according to the present invention.
Figure 9:
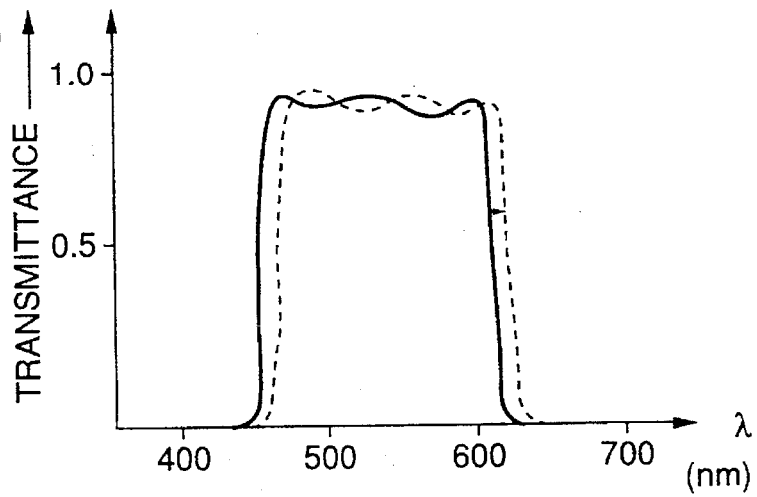
FIG. 9 is an explanatory drawing to show spectral characteristics of the part of the second embodiment according to the present invention.

FIG. 8 is an explanatory drawing to show a part of a second embodiment of the color image reading apparatus according to the present invention. In the second embodiment wavelength selection means 31 comprising a wideband filter as described above is arranged to rotate about a rotation shaft 81 by means of drive means 85, whereby an incident angle of an optical flux from a projection optical system 2 into the wavelength selection means 31 is made variable. By this arrangement, a central wavelength of spectral transmittance of the wavelength selection means 31 is shifted within a range as shown by a solid line and by a dotted line to properly keep a balance between color blur amounts of + first order diffraction light and of − first order diffraction light.

Figure 10:
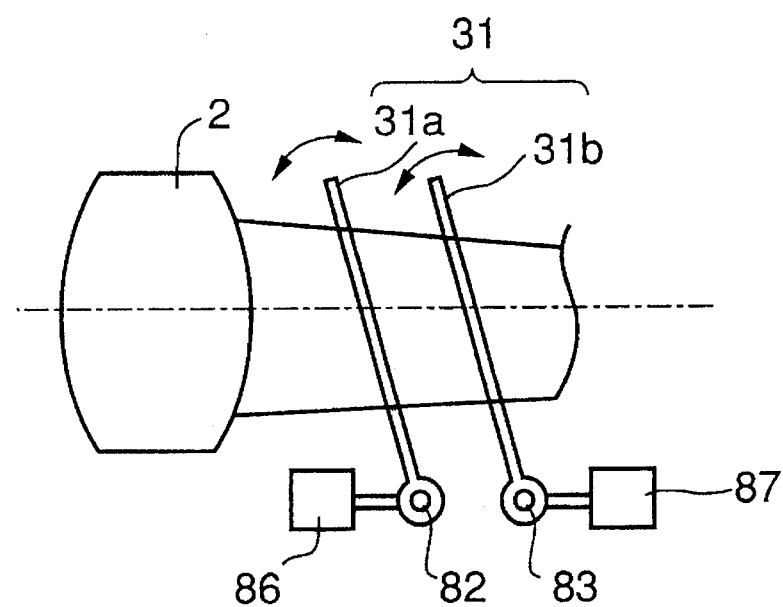
FIG. 10 is an explanatory drawing to show a part of a third embodiment according to the present invention.
Figure 11:
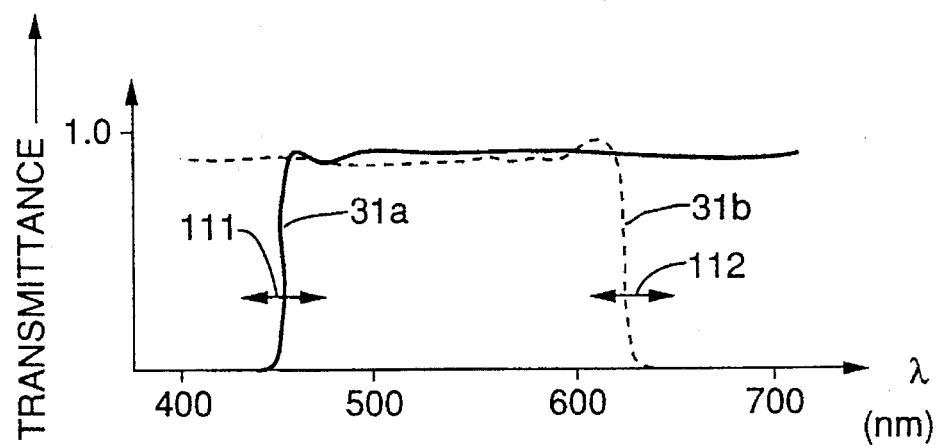
FIG. 11 is an explanatory drawing to show spectral characteristics of the third embodiment according to the present invention.

FIG. 10 is an explanatory drawing to show a part of a third embodiment of the color image reading apparatus according to the present invention. In the present embodiment wavelength selection means 31 is composed of a wideband short wavelength filter 31a to limit a transmission optical flux on the short wavelength side and a wideband long wavelength filter 31b to limit a transmission optical flux on the long wavelength side. At least one of the filters (the both filters in FIG. 10) is arranged to be independently rotatable about a rotation shaft 82, 83 by drive means 86, 87, whereby the incident angle of optical flux is made variable. In this arrangement, an optical flux passing through the wavelength selection means 31 may be independently adjusted on the short wavelength side and on the long wavelength side in directions as shown by arrows 111 and 112 in FIG. 11, whereby color blur amounts of + first order diffraction light and of − first order diffraction light may be adjusted independent of each other.

As described above, the color image reading apparatus of the present invention is characterized in that the illuminating means illuminates a color image on the original plane, that the projection optical system projects the color image onto the surface of the detecting means comprising the three line sensors parallel to each other on the single substrate, that the one-dimensional blazed diffraction grating is disposed after the projection optical system to separate an optical flux from the projection optical system into three color lights then to guide them to the respective line sensors in reading the color image by the detecting means, and that the wavelength selecting means is provided in the optical path between the original plane and the one-dimensional blazed diffraction grating to permit only an optical flux within a specific wavelength range to pass therethrough.

The color image reading apparatus of the present invention is further characterized in that the wavelength selection means comprises the wideband filter and that an incident angle of optical flux into the wideband filter may be adjusted to make the transmission wavelength range variable.

In addition, the color image reading apparatus is characterized in that the wavelength selection means comprises the short wavelength filter to restrict a passing optical flux on the short wavelength side and the long wavelength filter to restrict a passing optical flux on a long wavelength side, and that at least one of the filters is adjustable as to an incident angle of optical flux thereinto to change the transmission wavelength range.

According to the present invention, in reading color image information by the line scan using the monolithic three line sensor, the wavelength selection means satisfying the above-described conditions and the one-dimensional blazed diffraction grating as the color separator are used, whereby the color image reading apparatus which may digitally read a color image in the high precision while effectively removing color blur in the components of ± first order diffraction light, may be attained.

What is claimed is:

1. A color image reading apparatus comprising:
   a plurality of line sensors comprising a plurality of one-dimensional sensor arrays disposed on a single substrate;
   a projection optical system for projecting an image of a subject on said sensors;
   a blazed diffraction grating disposed in an optical path between said projection optical system and said sensors to separate light from said subject into a plurality of color light components; and
   wavelength selection means disposed in an optical path between said subject and said sensors to permit only a beam of light within a specific wavelength range to pass therethrough, said wavelength selection means preventing color blur, caused by off axis light from said subject, from being diffracted by said blazed diffraction grating so as to enter said sensors.

2. A color image reading apparatus according to claim 1, wherein said wavelength selection means comprises a wideband filter and wherein an incident angle of light into said wideband filter is adjusted to make the passing wavelength range variable.

3. A color image reading apparatus according to claim 1, wherein said wavelength selection means comprises a short wavelength filter to restrict passage of light on a short wavelength side and a long wavelength filter to restrict passage of light on a long wavelength side, and wherein an incident angle of light into at least one of said filters is adjusted to make the passing wavelength range variable.

4. A color image reading apparatus according to claim 1, wherein said plurality of line sensors are a plurality of line sensors comprising plural lines of one-dimensional sensor arrays which are disposed apart at respective finite distances from each other in a direction perpendicular to an array direction of the sensor arrays.

5. A color image reading apparatus according to claim 4, wherein said blazed diffraction grating separates the light from said subject into a plurality of color lights in the direction perpendicular to said array direction.

6. A color image reading apparatus according to claim 4, wherein said subject is scanned in a sub scanning direction, which is the direction perpendicular to the array direction of the sensor arrays.

7. A color image reading apparatus according to claim 1, wherein said blazed diffraction grating is a one-dimensional blazed diffraction grating.

8. A color image reading apparatus according to claim 1, wherein said wavelength selection means includes a wideband filter.

9. A color image reading apparatus according to claim 8, wherein said wideband filter is constructed such that a wavelength width $T_{+1}$, $T_{-1}$ having light quantity exceeding 10% of light quantity of the peak wavelength in the spectrum distribution of the ±first-order diffraction light is less than 60 nm.

10. A color image reading apparatus according to claim 8, wherein said wideband filter permits only a light beam within a wavelength range of 455 nm to 610 nm to pass therethrough.

11. A color image reading apparatus according to claim 1, wherein said wavelength selection means includes a short wavelength filter to restrict passage of light on a short wavelength side and a long wavelength filter to restrict passage of light on a long wavelength side.

12. A color image reading apparatus comprising:
   a plurality of line sensors;
   a projection optical system for projecting an image of a subject on said sensors;
   a blazed diffraction grating disposed in an optical path between said projection optical system and said sensors to separate light from said subject into a plurality of color lights; and
   wavelength selection means disposed in an optical path between said subject and said sensors to permit only a beam of light within a specific wavelength range to pass therethrough, said wavelength selection means preventing color blur, caused by off axis light from said subject, from being diffracted by said blazed diffraction grating so as to enter said sensors.

13. A color image reading apparatus according to claim 12, wherein said wavelength selection means comprises a wideband filter and wherein an incident angle of light into said wideband filter is adjusted to make the passing wavelength range variable.

14. A color image reading apparatus according to claim 12, wherein said wavelength selection means comprises a short wavelength filter to restrict passage of light on a short wavelength side and a long wavelength filter to restrict passage of light on a long wavelength side, and wherein an incident angle of light into at least one of said filters is adjusted to make the passing wavelength range variable.

15. A color image reading apparatus according to claim 12, wherein said plurality of line sensors are a plurality of line sensors comprising plural lines of one-dimensional sensor arrays which are disposed apart at respective finite distances from each other in a direction perpendicular to an array direction of the sensor arrays.

16. A color image reading apparatus according to claim 15, wherein said blazed diffraction grating separates the light from said subject into a plurality of color lights in the direction perpendicular to said array direction.

17. A color image reading apparatus according claim 15, wherein said subject is scanned in a sub scanning direction, which is the direction perpendicular to the array direction of the sensor arrays.

18. A color image reading apparatus according to claim 12, wherein said blazed diffraction grating is a one-dimensional blazed diffraction grating.

19. A color image reading apparatus according to claim 12, wherein said wavelength selection means includes a wideband filter.

20. A color image reading apparatus according claim 19, wherein said wideband filter is constructed such that a wavelength width $T_{+1}$, $T_{-1}$ having light quantity exceeding 10% of light quantity of the peak wavelength in the spectrum distribution of ±first-order diffraction light is less than 60 nm.

21. A color image reading apparatus according to claim 19, wherein said wideband filter permits only the light beam within a wavelength range of 455 nm to 610 nm to pass therethrough.

22. A color image reading apparatus according to claim 12, wherein said wavelength selection means includes a short wavelength filter to restrict passage of light on a short wavelength side and a long wavelength filter to restrict passage of light on a long wavelength side.

* * * * *

UNITED STATES PATENT AND TRADEMARK OFFICE
CERTIFICATE OF CORRECTION

PATENT NO. : 5,481,381

DATED : January 2, 1996

INVENTOR(S) : Fujimoto

It is certified that error appears in the above-identified patent and that said Letters Patent is hereby corrected as shown below:

On the title page, item
[63] RELATED U.S. APPLICATION DATA

Cover Page, "Continuation-in-part"
    should read --Continuation--.

COLUMN 1

Line 33, "Des." should read --DE--.
Line 34, "2,645,075" should read --2645075--.

COLUMN 4

Line 15, "2278-2276" should read --2273-2276--.
Line 57, "degree" should read --degrees--.

COLUMN 5

Line 4, "$\lambda_{+1}$" should read --$\lambda_{\pm 1}$--.
Line 7, "first" should read --+first--.

UNITED STATES PATENT AND TRADEMARK OFFICE
CERTIFICATE OF CORRECTION

PATENT NO. : 5,481,381

DATED : January 2, 1996

INVENTOR(S): Fujimoto

It is certified that error appears in the above-identified patent and that said Letters Patent is hereby corrected as shown below:

<u>COLUMN 7</u>

Line 62, "the±first-order" should read
      --the ± first-order--.

<u>COLUMN 8</u>

Line 56, "of±first-order" should read
      --of ± first-order--.

Signed and Sealed this

Twenty-eighth Day of May, 1996

Attest:

BRUCE LEHMAN

*Attesting Officer*    *Commissioner of Patents and Trademarks*